O. STONE.
SEEDER AND FERTILIZER.

No. 189,516. Patented April 10, 1877.

WITNESSES
Henry N. Miller
Frank Galt

INVENTOR
Oren Stone
Alexander Mater
ATTORNEYS.

UNITED STATES PATENT OFFICE.

OREN STONE, OF FLINT, MICHIGAN, ASSIGNOR OF ONE-HALF HIS RIGHT TO OLIVER PERRY, OF SAME PLACE.

IMPROVEMENT IN SEEDER AND FERTILIZER.

Specification forming part of Letters Patent No. 189,516, dated April 10, 1877; application filed March 15, 1877.

*To all whom it may concern:*

Be it known that I, OREN STONE, of Flint, in the county of Genesee, and in the State of Michigan, have invented certain new and useful Improvements in Seeders and Fertilizers; and do hereby declare that the following is a full, clear, and exact description thereof, reference being had to the accompanying drawings, and to the letters of reference marked thereon, making a part of this specification.

The nature of my invention consists in the construction and arrangement of a seeder and fertilizer, as will be hereinafter more fully set forth.

In order to enable others skilled in the art to which my invention appertains to make and use the same, I will now proceed to describe its construction and operation, referring to the annexed drawing, in which—

Figure 1:
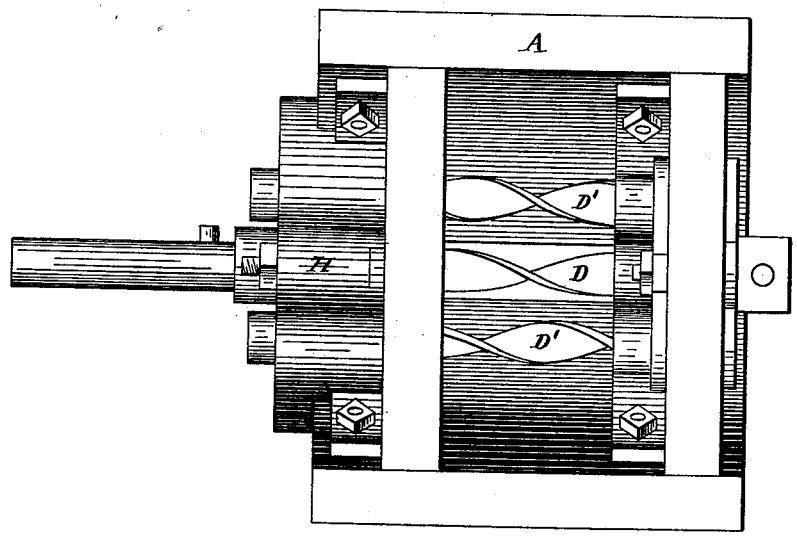
Figure 3:
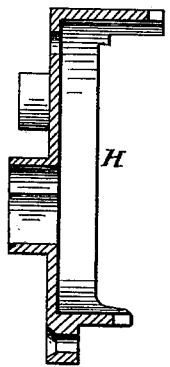
Figure 2:
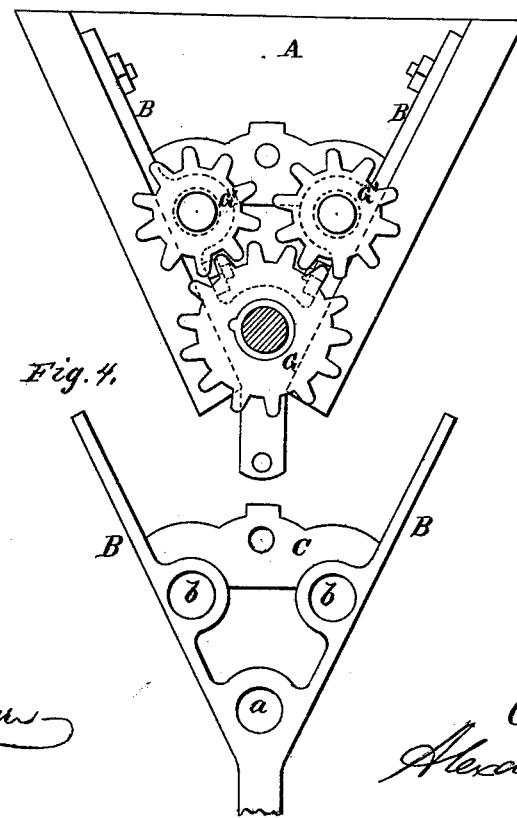
Figure 5:
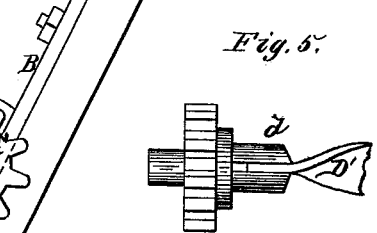

Figure 1 is a plan view of my invention. Fig. 2 is a side view of the same, with the cap covering the gearing removed. Figs. 3, 4, and 5 are detailed views of parts thereof.

A represents the seed or fertilizer hopper, of any suitable dimensions.

On the inner side of one end piece of the hopper is placed a V-shaped casting, composed of two straps, B B, joined together at their lower ends, and connected by a cross-bar, C, as shown, a suitable distance below their upper ends. At the junction of the two straps B B is formed a box, *a*, and on the inside of each strap, a suitable distance above the box *a*, is formed another box, *b*.

This casting is bolted inside of the hopper at one end by bolts through the straps B B and through the cross-bar C.

A similar casting is fastened on the outside of the other end piece.

The boxes *a* and *b b* of the two castings form the bearings for three agitators, D and D' D', which are simply flat bars or plates, twisted as shown.

The inner ends of these agitators rotate directly in their respective boxes, while their outer ends are inserted in slotted journals *d*, projecting respectively from cog-wheels G and G' G', said journals being passed through the outside casting, and the three cog-wheels are then on the outside of the hopper and mesh together, as shown in Fig. 2.

The cog-wheel G is of larger diameter than the wheels G', so that the central lower agitator D will rotate at a slower rate of speed than the upper or side agitators D'.

The gearing is covered by a cap, H, having suitable projecting hubs to receive the outer journals of the cog-wheels. The journal of the cog-wheel G extends outward far enough to connect with the mechanism arranged for giving the same a continuous rotary motion.

By having several agitators of the form shown, and rotating at varying rates of speed, the seed or fertilizer is kept in constant motion in such suitable manner that no clogging can occur, but that it will be fed evenly and properly with the most perfect regularity. The gearing being entirely inclosed by the cap H, no dirt of any kind can get into the same to clog it up.

Having thus fully described my invention, what I claim as new, and desire to secure by Letters Patent, is—

1. The castings herein described, consisting of the inclined side straps B B, united at their lower ends, connected by the cross-bar C, and formed with the boxes *a* and *b b*, substantially as and for the purposes herein set forth.

2. In a seed or fertilizer hopper, the twisted agitators D and D' D', arranged as described, and rotating at varying rates of speed, substantially as and for the purposes herein set forth.

3. The combination, with the hopper A, of the castings B C B C, twisted agitators D D', gear-wheels G G', of varying size, provided with slotted journals *d*, and the cap H, substantially as and for the purposes herein set forth.

In testimony that I claim the foregoing I have hereunto set my hand this 17th day of February, 1877.

OREN STONE.

Witnesses:
H. C. VAN DEUSER,
ED. A. DAVIS.